July 2, 1963  R. W. HUTCHINS ETAL  3,095,744
GRAVITY GRADIENT MEASURING DEVICE
Filed Aug. 11, 1960  3 Sheets-Sheet 1
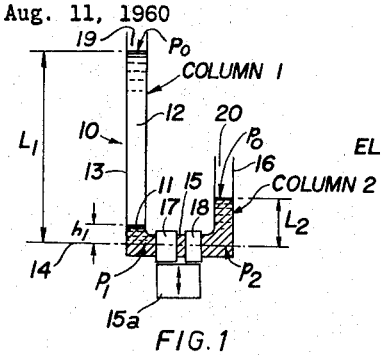
FIG. 1
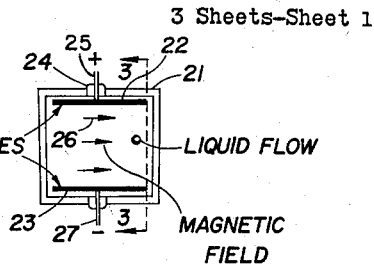
FIG. 2
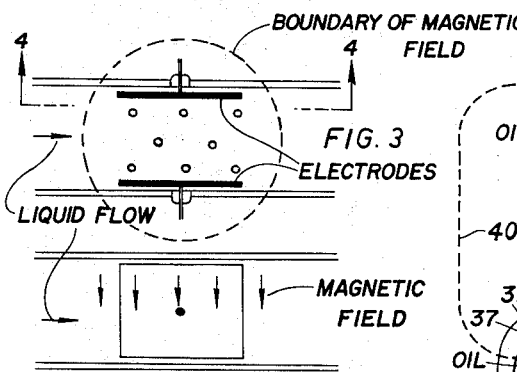
FIG. 4
FIG. 3
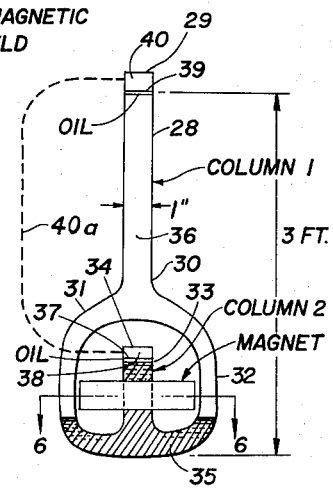
FIG. 5
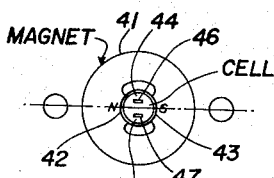
FIG. 6
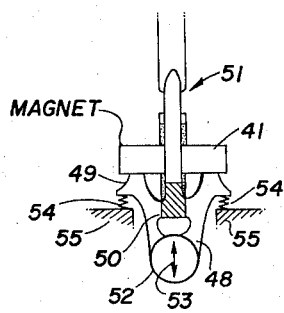
FIG. 7
Inventors
R.W. HUTCHINS
D.F. D'ARCY
by: Cavanagh & Norman Inventors
R W. HUTCHINS
D.F. D'ARCY by: Cavanagh & Norman July 2, 1963  R. W. HUTCHINS ETAL  3,095,744
GRAVITY GRADIENT MEASURING DEVICE
Filed Aug. 11, 1960  3 Sheets-Sheet 3

Inventors
R.W. HUTCHINS
D. F. D'ARCY
by: Cavanagh & Norman

United States Patent Office 3,095,744
Patented July 2, 1963

3,095,744
GRAVITY GRADIENT MEASURING DEVICE
Roger William Hutchins, Toronto, Ontario, and Donald F. D'Arcy, Scarborough, Ontario, Canada, assignors to Hunting Survey Corporation Limited, Toronto, Ontario, Canada
Filed Aug. 11, 1960, Ser. No. 49,094
14 Claims. (Cl. 73—382)

This invention relates to a fluid motion sensing device especially adapted to the sensing of gravity gradient useful for the measurement of variations in the local vertical gradient of gravitational acceleration.

In application Serial Number 842,462 filed September 25, 1959, by R. W. Hutchins, now abandoned, and assigned to the same assignee as the instant application, there is disclosed a system embodying two discrete liquid masses of different density supported in hydrostatic equilibrium at a predetermined gravimetric acceleration with means for communicating the hydrostatic pressure of one mass to the other. Measurement of the motion of the fluids due to change in hydrostatic pressure enables a direct measurement of the local acceleration due to gravity.

The specific means for accomplishing measurement embodies a physically movable meniscus required to be sensed by suitable optical means. While in a general sense such system is satisfactory for the purpose of measuring a gravity gradient, a greater refinement of measurement is enabled by this invention and in particular the elimination of errors which might arise in certain conditions of vertical acceleration of an aircraft carrying the sensing device.

It is the main object of this invention to provide a fluid motion sensing device adaptable for mass balancing.

It is another object of this invention to provide a fluid motion sensing device and system embodying means for vibrating the same at predetermined frequency and in at least one predetermined direction thereby to eliminate exterior effects which would otherwise give rise to error in the motion sensing operation.

It is another object of the invention to provide a gravity gradient sensing device in which temperature and other effects may be compensated for in direct manner subject to minor adjustment from time to time.

Other objects of the invention will be apparent from a study of the following specification taken into conjunction with the accompanying drawings.

In the drawings:

FIGURE 1 is a diagrammatic illustration of the elementary concept of the combination of elements utilized in applicant's invention;

FIGURE 2 is a sectional view of a form of combined sensing and pressure adjustment cell according to the invention;

FIGURE 3 is a view on the line 3—3 of FIGURE 2;

FIGURE 4 is a view on the line 4—4 of FIGURE 3;

FIGURE 5 is a sectional view of one geometric configuration of liquid container and sensing pressure cell combination which may be contrived according to the concept of the invention;

FIGURE 6 is a sectional view on the line 6—6 of FIGURE 5;

FIGURE 7 illustrates the mounting for vertical vibrational actuation of the structure of FIGURE 5 in a practical embodiment;

Figure 8:
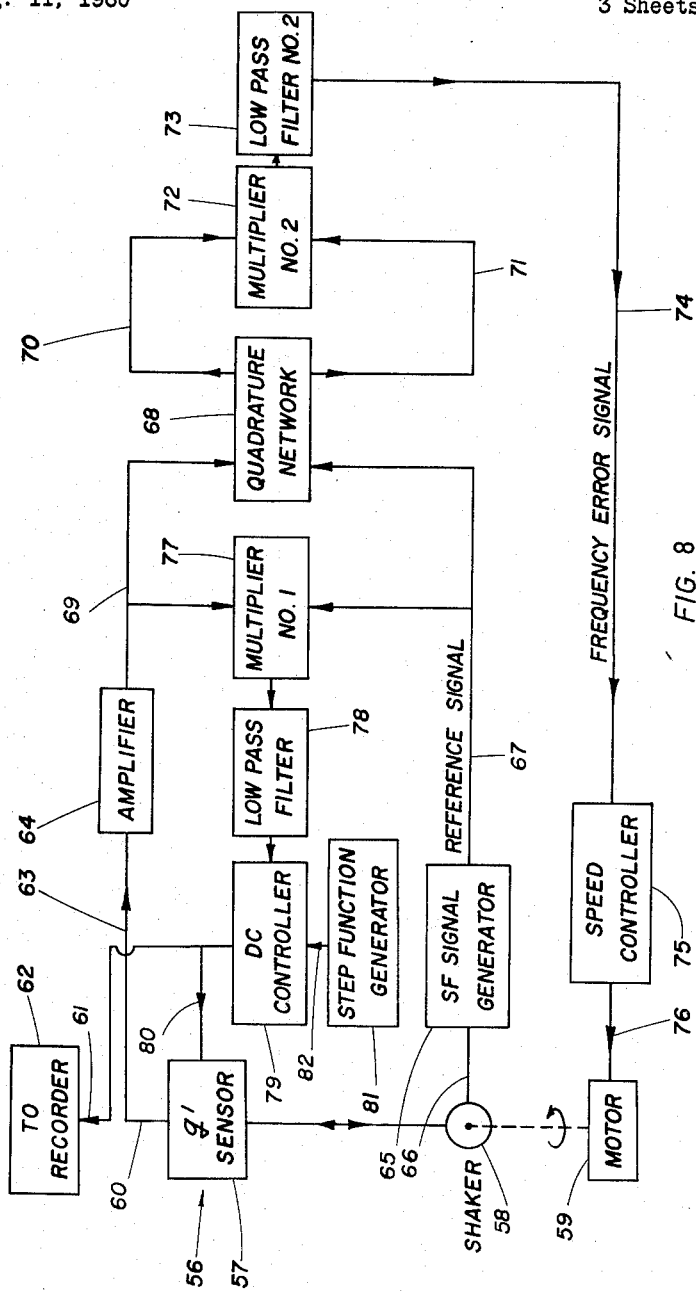
FIGURE 8 is an electrical schematic block diagram of a gravity gradient measuring system embodying the sensing device disclosed herein.

Referring to FIGURE 1, the gravity gradient sensing device and system of the invention in its more general concept comprises the hollow tube 10 generally in the geometric configuration of the letter U and containing two immiscible liquids 11 and 12 of different density. It is preferred, for purposes of the invention, that one of these liquids, as for example the liquid 11, be mercury, whereby the physical size of the apparatus may be kept within reasonable limits for portability. The other liquid should be immiscible in the first and though of lesser density should nevertheless be as close as possible to one half the density of the heavier liquid. The liquid 12 may be an aqueous salt solution of specific gravity about 2.5 grams per cubic centimeter. The long arm 13 of the tube structure 10 may be regarded as a vertical column in which the hydrostatic pressure at the base of the column of liquid therein may be regarded as effective on the line 14 being the axis of the base portion 15 of the tube structure communicating between the arm or column 13 and the other arm or column 16.

The hydrostatic pressure at the base of the longer column hereinafter referred to as column 1 is:

$$p_1 = p_0 + \rho_1\left[g_0(L_1-h_1)+\frac{g_0^1}{2}(L_1^2-h_1^2)\right] + \rho_2\left[g_0 h_1+\frac{g_0^1 h_1^2}{2}\right]$$

The hydrostatic pressure at the base of column 2 is:

$$p_2 = p_0 + \rho_2\left[g_0 L_2 + \frac{g_0^1 L_2^2}{2}\right]$$

In these equations $p$ is the local hydrostatic pressure, $\rho$ is the liquid mass density, $g_0$ and $g_0^1$ are the local values of the acceleration due to gravity and the vertical gradient of this quantity respectively, and the other symbols are as described in FIGURE 1 wherein $L_1$ is the height from the axis 14 to the top surface of the lesser density liquid in column 1, $h_1$ is the height of the denser liquid in column 1 above the axis 14, $L_2$ is the height of the denser liquid in column 2 above the axis 14, $p_0$ is the pressure at the free surfaces of the liquids in columns 1 and 2, $p_1$ is the pressure at axis 14 in column 1 and $p_2$ is the pressure at axis 14 in column 2. The liquids would normally flow back and forth in the tube until the heights of the two liquid columns were such that the hydrostatic pressure at the base of column 1 was equal to that at the base of column 2. However, a pressure adjustment cell 17 is included in the mercury-containing portion of the tube, as shown in FIGURE 1 for the purpose of maintaining a small but controllable hydrostatic pressure difference between the liquids at opposite ends of this cell. If $p$ is the pressure difference maintained by the pressure adjustment cell, the liquids will flow back or forth through the tube until the column heights are such that the following relationship is satisfied:

$$p=[\rho_2(L_2-h_1)-(L_1-h_1)]g_0$$
$$+[\rho_2(L_2^2-h_1^2)-\rho_1(L_1^2-h_1^2)]g_0^1/2 \quad (3)$$

The pressure applied across the pressure adjustment cell can be adjusted until:

$$\rho_2(L_2-h_1)=\rho_1(L_1-h_1) \quad (4)$$

and will then be equal to:

$$p=[\rho_2(L_2^2-h_1^2)-\rho_1(L_1^2-h_1^2)]g_0^1/2 \quad (5)$$

The liquids are then said to be in the balance position. The equilibrium Equation 3 has thus become Equation 5, and in particular is now independent of $g_0$. Also, the pressure applied by the pressure adjustment cell is directly proportional to the local gravity gradient.

If the instrument is shaken in a vertical direction, i.e., if it is caused to execute sine wave motion in the vertical direction at a definite frequency, the balance condition Equation 5 will not be affected by the shaking since the only effect on the system of the shaking is the acceleration which it produces, and this will merely modify the local acceleration due to gravity, to which the instrument is insensitive because of Equation 4. The liquids will therefore not move in the tube even when the instrument is shaken so long as the balance condition Equation 5 holds. If, however, the local gravity gradient should change but a corresponding adjustment in the pressure applied by the pressure adjustment cell is not made, the equilibrium Equation 3 once more applies, and the acceleration applied by the shaking must be added to the local gravitational acceleration $g_0$ and hence Equation 3 cannot be satisfied by the constant applied value of $p$. The liquids will therefore oscillate back and forth in the tube at the shaking frequency.

A sensing cell 18 is also incorporated in the mercury-containing portion of the tube for the purpose of detecting motion of the liquids back and forth in the tube. Thus, when the instrument is not in the balance position, the shaking will cause the liquids to move back and forth in the tube at the shaking frequency, this in turn will cause an alternating voltage at the shaking frequency to be generated in the sensing cell. This voltage can be used to control the direct current through the pressure adjustment cell and thereby to provide continuous adjustment of the pressure change applied across this cell until the latter is of sufficient magnitude to put the instrument into the balance condition at which time the liquids will cease to move in the tube and no voltage will be generated by the sensing cell. When the instrument is in the balance condition, the direct current through the pressure adjustment cell will be directly proportional to the local gravity gradient and the magnitude of this current may be recorded continuously as a continuous record of the local local gravity gradient.

Thus the mechanical shaker 15a and the sensing and pressure adjustment cells 17, 18 form a system providing a continuous balance of the masses of liquids in the two columns according to Equation 4. Note that the physical balance position of liquids in the tube never changes, but only the current through the pressure adjustment cell varies according to the disturbing force of the local gravitational gradient. In a micromanometer arrangement, only one liquid, mercury, need be used. The two pressures which are to be compared continuously are applied to chambers 19 and 20 at the tops of the two columns. The pressure applied across the pressure adjustment cell will then be equal to the difference between the two pressures which are to be compared. A continuous record of this pressure difference may be given by a record of the current through the pressure adjustment cell.

The sensing cell and the pressure adjustment cell are conceptually identical. A strong magnetic field is applied locally in a direction perpendicular to the flow of mercury through the cell. Two electrodes are incorporated in the cell walls in such way that a line joining the centres of the two electrodes would be perpendicular to both the direction of flow of the mercury and the direction of the magnetic field. The arrangement is shown in FIGURES 2 to 4.

The cell disclosed in FIGURES 2 to 4 may be formed within a suitable tube 21 having supported therein the flat plate electrodes 22 and 23 disposed in parallel spaced apart relation adjacent opposite walls thereof and preferably anchored thereto by a glass bead formation 24 sealed about a rigid conductor 25 extending through the tube wall and rigidly connected to the electrode. The plus and minus sign associated with the conductors for the electrodes indicates that a small current flows from one electrode to the other. The heavier liquid which preferably is a good conductor, such as mercury, and which carries the current between the electrodes thus experiences a force at right angles to both the direction of the current and the direction of the magnetic field, this force being in the direction of the axis 14, i.e., in the direction of fluid flow between column 1 and column 2. This force so generated may be recorded and according to the invention is utilized as equivalent to a hydrostatic pressure applied over the sectional area of the cell, i.e., of the tube 21, perpendicular to the flow of liquid through the cell.

In the sensing cell described, the motion of the mercury, which is an electrical conductor, through the magnetic field 26, causes a voltage to be generated in a direction at right angles to both the direction of the mercury flow and the direction of the magnetic field. The electrodes 22 and 23 are thus inherently in the proper orientation to sense this generated voltage. The electrical leads 25 and 27 may therefore be led to electronic devices (FIGURE 8) adapted to detect the presence and phase of such generated voltage at the shaking frequency.

The magnitude and phase of this voltage indicate the magnitude and direction of the unbalance of the liquids in the tube and thus provide a means of correcting the unbalance. Since the sensing cell and the pressure adjustment cell may be identical in construction, and since the bias current supplied to one and the A.C. voltage generated by the other may be effectively separated by electronic means, the two cells may be combined in a single cell which will perform both functions. Thus the instrument need incorporate only a single cell of the design shown.

Energy will be dissipated in both the electrical and mechanical parts of the system. Thus the system will be damped and when the pressure adjusting current is made sufficient to balance the instrument, the oscillations of the liquids in the tube will die down quickly so that the achievement of the balance condition can be recognized quickly. The shaking frequency should be such that adequate sensitivity to unbalance is provided. Because of the damping of the system, it will be necessary that the shaking frequency be a function of the natural frequency of oscillation of the mechanical system alone. For maximum power output, the electrical part of the system should also be tuned to the shaking frequency.

Since temperature or other effects may alter this mechanical tuning frequency from time to time, a periodic adjustment of the shaking frequency is desirable. This can be achieved by applying a deliberate unbalance to the system by means of the pressure adjustment cell in order to provide a definite signal at the sensing cell. While this unbalance is being applied, the shaking frequency can be adjusted until the voltage generated by the sensing cell reaches a maximum or a sufficient amplitude. The deliberate unbalance will then be removed and the shaking frequency will be kept at this value until the next similar adjustment is made.

FIGURES 5 to 7 disclose a preferred practical concept in which a column 28 having an upper end 29, the lower end 30 thereof diverging in two branches or arms 31 and 32 communicating and conjoining with a secondary column 33 preferably coaxially lined with the column 28 and disposed therebelow, the secondary column having a closed end 34. By way of example, the secondary column may contain mercury 35 upon which an aqueous salt solution 36 is floated within the arms 31 and 32 and the primary column 28. A thin layer of oil of low vapour pressure is floated on the mercury as at 37 to support the same from a low pressure gas chamber 38 defined by the oil layer within the secondary column and the end wall 34 of the column. Likewise oil layer 39 is floated on the saline solution in the primary column 28 to define a low pressure gas chamber 40 within the column in association with the end wall 29 thereof. Gas chambers 38 and 40 intercommunicate by way of line 40a so that the pressures therein may at all times be equal. The secondary column 33 is adapted to rigidly carry the magnet device 41 of generally annular configuration having inner pole portions 42 and 43 engaging the columnar surfaces of the secondary column. In FIGURE 6 it will be observed that the secondary column embodies electrodes 44 and 45 from which extend the electrical leads 46 and 47.

The structure described with reference to FIGURES 5 and 6 may be supported in the manner illustrated in FIGURE 7 by a carrier 48 having an annular flange 49 preferably formed of a non-magnetic material and rigidly carrying the permanent magnet 41. The carrier also embodies structure 50 adapted to support the primary and secondary column structure generally indicated by numeral 51. A vibrating device 52 forming a part of carrier 48 is adapted to reciprocate the carrier vertically as indicated by arrow 53 at a predetermined frequency whereby the same may vetrically vibrate in space on support springs 54 rising from a suitable instrument base 55.

In operation, when the fluids in columns 1 and 2 are in hydrostatic equilibrium, the product of density and column height of fluid filling each column will be different due to any gravitational gradient acting at the instrument. When the instrument is airborne, the motion of the aircraft may subject the instrument to vertical acceleration whereby the inertia of the unbalanced masses results in a pressure gradient in the connecting tubes joining the two columns and thus the liquids will endeavour to seek a new position of hydrostatic equilibrium and therefore will move. However, according to this invention a vertical shaking frequency is added to the system in which the acceleration component at shaking frequency is dominant and renders the system unresponsive to other components. As a result, any mass unbalance due to gravitational gradient will result in the fluids oscillating from one column to another at the shaking frequency. The sensing cell is so located that one of the working fluids flows through it, the oscillation of the fluids resulting in an alternating current signal output responsive to mass unbalance. As described, a biasing current is also passed through the sensing cell artificially to apply a pressure gradient proportional to the current applied. By this means the cell is biased so that the length $x$ density of fluid in columns 1 and 2 are equal as in Equation 4. The bias current must be sufficient to offset the mass unbalance caused by the gravitational gradient. Accordingly the magnitude of the current is proportional to the gravitational gradient. As described hereinafter, the mass balance position may be determined by adjusting the balance current until a zero alternating current signal output at the shaking frequency results at the sensing cell. Preferably the shaking frequency complex will be the same as the mechanical resonating frequencies of the system especially for maximum sensitivity. The associated electronic system is illustrated in electrical schematic in FIGURE 8 in which 56 indicates a gravity gradient sensing device including a sensing cell 57, a shaking device 58 and a drive motor 59 actuating the shaking device and in which the sensing device may be of the form illustrated in FIGURES 5 to 7. The output leads 60 of the sensor may proceed by line 63 to a narrow band amplifier 64 tuned to shaking frequency. A shaking frequency signal generator 65 is shown associated diagrammatically by line 66 with the shaker 58 to indicate that an electrical signal is extracted from the shaker responsive to the vertical shaking motion of the latter at the same frequency and selected phase and such an electrical signal is used as a reference signal connected by line 67 to the quadrature network 68 of conventional electronic configuration and to which is also connected line 69 leading from amplifier 64. The output of the quadrature network proceeds by lines 70 and 71 to a multiplier 72. The quadrature network shifts the phases of the sensor output from line 69 and the reference signal from line 67 by 90 degrees. Low pass filter 73 smooths the output of the multiplier 72 to deliver a frequency error signal by line 74 to a speed controlling device 75 connected by line 76 to motor 59. The frequency error signal from line 74 will be zero when the shaking frequency applied corresponds to the mechanical resonance frequency of the system. The frequency error signal will also be zero when the two liquid masses are in balance. The polarity of the frequency error signal varies the shaking frequency so that it always matches the mechanical resonance frequency. The biasing of the sensing cell is accomplished by multiplying the signals from amplifier 64 and the reference line 67 in multiplier 77 and processing such multiplied signals through the low pass filter 78 to the bias current controller 79. The multiplier 77 functions as a phase detector comparing the sensor output with a reference from the shaker. Low pass filter 78 averages the output of the phase detector to obtain any direct current component that may be present. The output from the low pass filter 78 is a balance error signal applied through the bias current controller to regulate the bias current by line 80 connecting to the sensing cell (not shown) of sensor 57 and thence by 61 to recorder 62. The polarity of the balance error signal will depend upon the direction of the mass unbalance. Since the system normally is in balance in order to obtain a frequency error signal, it will be preferable though not essential to unbalance the system from time to time. This may be accomplished by a step function generator 81 of conventional form connecting to direct current controller by line 82 replacing the balance error signal from the low pass filter 78.

Figure 9:
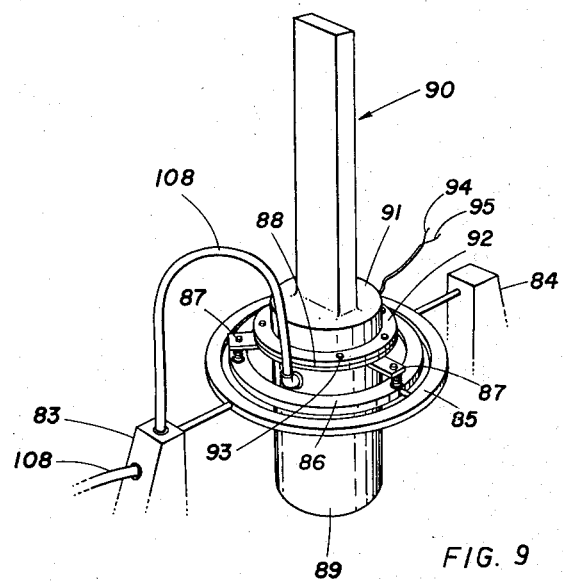
FIGURE 9 is a perspective view of a physical concept of apparatus substantially according to FIGURE 7 but in which the system is enclosed; and, FIGURE 10 is a schematic ilustration of one suitable device disclosed herein.
Figure 10:
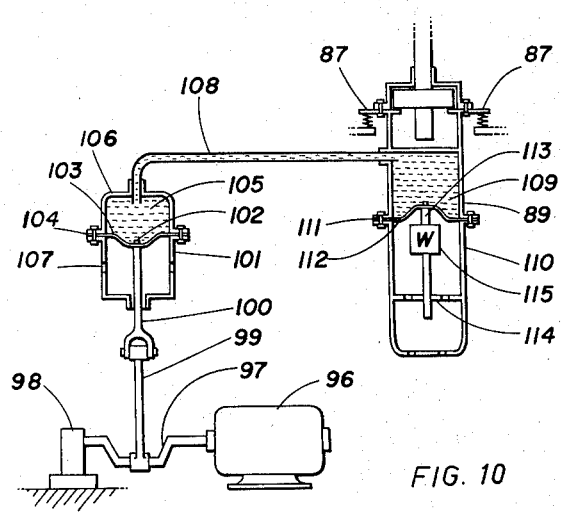

FIGURES 9 and 10 illustrate a structural embodiment of one form of the invention adapted for the measurement of gravity gradient. In FIGURE 9 the anchorages 83 and 84 pivotally support the gimbal mounting rings 85 and 86 carrying the spring support outwardly extending tripod legs 87 extending from flange 88 of the shaker case 89. The upper enclosure 90 extends over tubular structure and magnet associated therewith preferably of a form described with reference to FIGURE 7. The base 91 of the upper enclosure extends over the magnet enclosed thereby and presents a clamping flange 92 fastened to flange 88 by bolts 93. Electrical leads 94 and 95 extend from the base enclosure 91 to communicate an electrical sensing signal to a recorder or amplifier and also may be utilized for connection to the bias current controller as set forth in FIGURE 8 where the sensing device is of the combined form illustrated in FIGURE 4.

The shaking device may be of the form illustrated in FIGURE 10 in which a motor 96 and crank shaft 97 supported by bearing plug 98 drive crank arm 99 reciprocally actuating piston 100 in cylinder 101. The head end 102 of piston arm 100 connects to flexible diaphragm 103 clamped to its marginal ends by clamp 104 to define a liquid chamber 105 in the head portion 106 of cylinder 101. The lower ends of cylinder 101 embodies air vents 107. A flexible communicating line 108 communicates chamber 105 to a corresponding chamber 109 of housing 89, the latter embodying a lower bowl portion 110 clamped by its flanges 111 thereto to support the periphery of flexible diaphragm 112 connected at its centre to a piston arm 113 slidable in guide 114 and carrying a suitable weight or mass 115 fixed thereto.

The reciprocation frequency may be of the order of about one cycle per second. It will therefore be understood that a direct motor drive as shown in FIGURE 10 for purposes of simplification will ordinarily require a speed reduction unit between the motor and the crank shaft 97. A constriction of chamber 105 will result in an expansion of chamber 109. Accordingly the weight 115 will reciprocate in a predetermined direction determined by the permitted direction of sliding motion thereof at an amplitude determined by the conditions in chamber 105 responsive to rotation of crank shaft 97.

While the sensing device and system of the invention has been disclosed with reference to the application thereof to the measurement of gravitational acceleration by sensing the motion of one of the liquids in the two columns described, it will be appreciated that the device herein may be regarded inherently as a fluid motion sensing device of a kind which may be utilized to sense the mass unbalance. Accordingly, a wide range of uses in airborne as well as ground systems may be visualized. Such a sensitive mass balance system may be utilized for the study of magnetic fields as well as gravity effects. Therefore, the use sometimes hereinafter of the term mass balance sensing device will be better understood with reference to the specific disclosure made herein as equivalent structurally but adapted for other use having regard to such ancillary equipment as may be necessary to form the kind of reading desired.

In general concept, the invention generally comprises a fluid motion sensing device having a fluid containing tube and comprising the combination therewith of at least two spaced apart electrodes adapted to communicate electrical current transversely through the fluid in the tube. Means are provided for establishing a magnetic field about the electrodes and oriented to establish a direction for the magnetic flux of the field substantially at right angles to the direction of current flow through the electrodes. Preferably, means are provided for biasing the electrical current flowing between the electrodes to adjust the fluid levels to ensure mass balance as in Equation 4. Additionally, means may be provided for physically shaking the liquid at at least one predetermined frequency of narrow band width to which the system is tuned. Therefore exterior components of motion due to exterior vibration conditions or acceleration components associated with the fluid such as thermal and other noise will not be accepted by the system except to the extent such components fall within the sensitive bandwidth and may thus be regarded as largely excluded and essentially insignificant.

What we claim is:

1. A gravity gradient sensing device comprising: two columns in the form of two substantially vertically disposed tubes, the upper closed ends of which are at equal pressure, the bottom ends thereof being joined by a common communicating tube therebetween; a different liquid in each of said columns, said liquids being in hydrostatic equilibrium at a predetermined gravitational gradient and movable in said tube under the influence of a different gravitational gradient to re-establish hydrostatic equilibrium at a new position in said tube; a volume of gas separating each of said liquids from the closed ends of the tubes describing the columns therefor; means for generating an electric current in a predetermined direction in one of said liquids proportional to a local gravitational gradient and maintaining said liquids in equilibrium; and means responsive to said electrical current to indicate the magnitude of said gravitational gradient.

2. A gravity gradient sensing device comprising: two columns in the form of two substantially vertically disposed tubes, the upper closed ends of which are at equal pressure, the bottom ends thereof being joined by a common communicating tube therebetween; a different liquid in each of said columns, said liquids being in hydrostatic equilibrium at a predetermined gravitational gradient and movable in said tube under the influence of a different gravitational gradient to re-establish hydrostatic equilibrium at a new position in said tube; a volume of gas separating each of said liquids from the closed ends of the tubes describing the columns therefor; means for generating an electrical current in a predetermined direction in one of said liquids proportional to a local gravitational gradient and biassing said liquids in equilibrium; at least two spaced apart electrodes located to communicate said electrical current transversely through one of said liquids; means establishing a magnetic field about said electrodes and oriented to establish direction for the magnetic flux of said field substantially at right angles to the direction of electrical current flow through said electrodes; and means responsive to said electrical current to indicate the magnitude of said gravitational gradient.

3. A gravity gradient sensing device comprising: two columns in the form of two substantially vertically disposed tubes, the upper closed ends of which are at equal pressure, the bottom ends thereof being joined by a common communicating tube therebetween; a different liquid in each of said columns, said liquids being in hydrostatic equilibrium at a predetermined gravitational gradient and movable in said tube under the influence of a different gravitational gradient to re-establish hydrostatic equilibrium at a new position in said tube; a volume of gas separating each of said liquids from the closed ends of the tubes describing the columns therefor; at least two spaced apart electrodes located to communicate an electrical current transversely through one of said liquids; means establishing a magnetic field about said electrodes and oriented to establish direction for the magnetic flux of said field substantially at right angles to the direction of electrical current flow through said electrodes; and means for generating and applying an electrical current to said electrodes thus to establish a pressure gradient and maintain said liquids in equilibrium; said electrical current being proportional to a local gravitational gradient; and means responsive to said electrical current to indicate the magnitude of said gravitational gradient.

4. A gravity gradient sensing device comprising: two columns in the form of two substantially vertically disposed tubes, the upper closed ends of which are at equal pressure, the bottom ends thereof being joined by a common communicating tube therebetween; a different liquid in each of said columns, said liquids being in hydrostatic equilibrium at a predetermined gravitational gradient and movable in said tube under the influence of a different gravitational gradient to re-establish hydrostatic equilibrium at a new position in said tube; a volume of gas separating each of said liquids from the closed ends of the tubes describing the columns therefor; at least two spaced apart electrodes located to communicate an electrical current transversely through one of said liquids; means establishing a magnetic field about said electrodes and oriented to establish direction for the magnetic flux of said field substantially at right angles to the direction of electrical current flow through said electrodes; means for applying an electrical direct current biasing to said electrodes thus to establish a pressure gradient proportional to a local gravitational gradient; and means for indicating the magnitude of gravitational gradient proportional to the mass balancing biasing current so applied.

5. A gravity gradient sensing device comprising: two columns in the form of two substantially vertically disposed tubes, the upper closed ends of which are at equal pressure, the bottom ends thereof being joined by a common communicating tube therebetween; a different liquid in each of said columns, said liquids being in hydrostatic equilibrium at a predetermined gravitational gradient and movable in said tube under the influence of a different gravitational gradient to re-establish hydrostatic equilibrium at a new position in said tube; a volume of gas separating each of said liquids from the closed ends of the tubes describing the columns therefor; means for generating an electrical current in a predetermined direction in one of said liquids proportional to a local gravitational gradient and maintaining said liquids in equilibrium; means for physically shaking said device in a direction parallel to a columnar axis of said columns to procure movement of said liquids while the same are not in equilibrium; and means responsive to said electrical current to indicate the magnitude of said gravitational gradient.

6. A gravity gradient sensing device comprising: two columns in the form of two substantially vertically disposed tubes, the upper closed ends of which are at equal pressure, the bottom ends thereof being joined by a common communicating tube therebetween; a different liquid in each of said columns, said liquids being in hydrostatic equilibrium at a predetermined gravitational gradient and movable in said tube under the influence of a different gravitational gradient to re-establish hydrostatic equilibrium at a new position in said tube; a volume of gas separating each of said liquids from the closed ends of the tubes describing the columns therefor; means for generating an electrical current in a predetermined direction in one of said liquids proportional to a local gravitational gradient and maintaining said liquids in equilibrium; at least two spaced apart electrodes located to communicate said electrical current transversely through one of said liquids; means establishing a magnetic field about said electrodes and oriented to establish direction for the magnetic flux of said field substantially at right angles to the direction of electrical current flow through said electrodes; and means for physically shaking said device in a direction parallel to a columnar axis of said columns to procure movement of said liquids while the same are not in equilibrium; and means responsive to said electrical current to indicate the magnitude of said gravitational gradient.

7. A gravity gradient sensing device comprising: two columns in the form of two substantially vertically disposed tubes, the upper closed ends of which are at equal pressure, the bottom ends thereof being joined by a common communicating tube therebetween; a different liquid in each of said columns, said liquids being in hydrostatic equilibrium at a predetermined gravitational gradient and movable in said tube under the influence of a different gravitational gradient to re-establish hydrostatic equilibrium at a new position in said tube; a volume of gas separating each of said liquids from the closed ends of the tubes describing the columns therefor; at least two spaced apart electrodes located to communicate an electrical current transversely through one of said liquids; means establishing a magnetic field about said electrodes and oriented to establish direction for the magnetic flux of said field substantially at right angles to the direction of electrical current flow through said electrodes; means for generating and applying an electrical direct current biasing to said electrodes thus to establish a pressure gradient and maintain said liquids in equilibrium; said electrical current being proportional to a local gravitational gradient; means for physically shaking said device in a direction parallel to a columnar axis of said columns and to procure movement of said liquids while the same are not in equilibrium; and means responsive to said electrical current to indicate the magnitude of said gravitational gradient.

8. A gravity gradient sensing device comprising: two columns in the form of two substantially vertically disposed tubes, the upper closed ends of which are at equal pressure, the bottom ends thereof being joined by a common communicating tube therebetween; a different liquid in each of said columns, said liquids being in hydrostatic equilbrium at a predetermined gravitational gradient and movable in said tube under the influence of a different gravitational gradient to re-establish hydrostatic equilibrium at a new position in said tube; a volume of gas separating each of said liquids from the closed ends of the tubes describing the columns therefor; at least two spaced apart electrodes located to communicate an electrical current transversely through one of said liquids; means establishing a magnetic field about said electrodes and oriented to establish direction for the magnetic flux of said field substantially at right angles to the direction of electrical current flow through said electrodes; means for applying an electrical direct current biasing to said electrodes thus to establish a pressure gradient proportional to a local gravitational gradient; means for indicating the magnitude of gravitational gradient proportional to the mass balancing biasing current so applied; and means for physically shaking said device in a direction parallel to a columnar axis of said columns.

9. A gravity gradient sensing device comprising: two columns in the form of two substantially vertically disposed tubes, the upper closed ends of which are at equal pressure, the bottom ends thereof being joined by a common communicating tube therebetween; a different liquid in each of said columns, said liquids being in hydrostatic equilibrium at a predetermined gravitational gradient and movable in said tube under the influence of a different gravitational gradient to re-establish hydrostatic equilibrium at a new position in said tube; a volume of gas separating each of said liquids from the closed ends of the tubes describing the columns therefor; means for generating an electrical current in a predetermined direction in one of said liquids proportional to a local gravitational gradient and maintaining said liquids in equilibrium; means for vibrating said device at shaking frequency substantially corresponding to the mechanical resonance frequency of said device to procure movement of said liquids while the same are not in equilibrium; and means responsive to said electrical current to indicate the magnitude of said gravitational gradient.

10. A gravity gradient sensing device comprising: two columns in the form of two substantially vertically disposed tubes, the upper closed ends of which are at equal pressure, the bottom ends thereof being joined by a common communicating tube therebetween; a different liquid in each of said columns, said liquids being in hydrostatic equilibrium at a predetermined gravitational gradient and movable in said tube under the influence of a different gravitational gradient to re-establish hydrostatic equilibrium at a new position in said tube; a volume of gas separating each of said liquids from the closed ends of the tubes describing the columns therefor; means for generating an electrical current in a predetermined direction in one of said liquids proportional to a local gravitational gradient and maintaining said liquids in equilibrium; at least two spaced apart electrodes located to communicate said electrical current transversely through one of said liquids; means establishing a magnetic field about said electrodes and oriented to establish direction for the magnetic flux of said field substantially at right angles to the direction of electrical current flow through said electrodes; means for vibrating said device at a shaking frequency substantially corresponding to the mechanical resonance frequency of said device to procure movement of said liquids while the same are not in equilibrium; and means responsive to said electrical current to indicate the magnitude of said gravitational gradient.

11. A gravity gradient sensing device comprising: two columns in the form of two substantially vertically disposed tubes, the upper closed ends of which are at equal pressure, the bottom ends thereof being joined by a common communicating tube therebetween; a different liquid in each of said columns, said liquids being in hydrostatic equilibrium at a predetermined gravitational gradient and movable in said tube under the influence of a different gravitational gradient to re-establish hydrostatic equilibrium at a new position in said tube; a volume of gas separating each of said liquids from the closed ends of the tubes describing the columns therefor; at least two spaced apart electrodes located to communicate an electrical current transversely through one of said liquids; means establishing a magnetic field about said electrodes and oriented to establish direction for the magnetic flux of said field substantially at right angles to the direction of electrical current flow through said electrodes; means for generating and applying an electrical direct current biasing to said electrodes thus to establish a pressure gradient and maintain said liquids in equilibrium; said electrical current being proportional to a local gravitational gradient; means for vibrating said device at a shaking frequency substantially corresponding to the mechanical resonance frequency of said device to procure movement of said liquids while the same are not in equilibrium; and means responsive to said electrical current to indicate the magnitude of said gravitational gradient.

12. A gravity gradient sensing device comprising: two columns in the form of two substantially vertically disposed tubes, the upper closed ends of which are at equal pressure, the bottom ends thereof being joined by a common communicating tube therebetween; a different liquid in each of said columns, said liquids being in hydrostatic equilibrium at a predetermined gravitational gradient and movable in said tube under the influence of a different gravitational gradient to re-establish hydrostatic equilibrium at a new position in said tube; a volume of gas separating each of said liquids from the closed ends of the tubes describing the columns therefor; at least two spaced apart electrodes located to communicate an electrical current transversely through one of said liquids; means establishing a magnetic field about said electrodes and oriented to establish direction for the magnetic flux of said field substantially at right angles to the direction of electrical current flow between said electrodes; means for applying an electrical direct current biasing to said electrodes thus to establish a pressure gradient proportional to a local gravitational gradient; means for indicating the magnitude of gravitational gradient proportional to the mass balancing biasing current so applied; and means for vibrating said device at a shaking frequency substantially corresponding to the mechanical resonance frequency of said device.

13. A fluid motion displacement sensing device having a tubular portion containing a fluid electrical conductor movable therein and comprising: at least two spaced apart electrodes located to communicate an electrical current through said fluid; means establishing a magnetic field about said electrodes and oriented to direct the magnetic flux thereof substantially at right angles to the direction of electrical current flow between said electrodes; means for sensing the movement of said fluid in said device and generating an electrical biasing current responsive thereto; means for applying said electrical biasing current to said electrodes in a direction compensating for motion of said fluid; and means for indicating the magnitude of said biasing current as a function of said fluid movement.

14. A fluid motion displacement sensing device having a tubular portion containing a fluid electrical conductor movable therein and comprising: at least two spaced apart electrodes located to communicate an electrical current through said fluid; means establishing a magnetic field about said electrodes and oriented to direct the magnetic flux thereof substantially at right angles to the direction of electrical current flow between said electrodes; means for applying electrical biasing current to said electrodes in a direction compensating for motion of said fluid; means for indicating the magnitude of said biasing current as a function of said fluid movement; and means for vibrating said device at a shaking frequency substantially corresponding to the mechanical resonance frequency of said device in a direction and at an amplitude rendering effectively insignificantly exterior components of acceleration to which the device may be subjected by exterior noise, vibrations and motion of said device.

References Cited in the file of this patent

UNITED STATES PATENTS

| | | |
|---|---|---|
| 1,404,062 | Rodes | Jan. 17, 1922 |
| 2,149,847 | Kolin | Mar. 7, 1939 |
| 2,386,369 | Thompson | Oct. 9, 1945 |

FOREIGN PATENTS

| | | |
|---|---|---|
| 1,017,804 | Germany | Oct. 17, 1957 |